United States Patent [19]
Evans

[11] 3,934,684
[45] Jan. 27, 1976

[54] COMBINED SERVICE AND PARKING BRAKE WITH AUTOMATIC ADJUSTOR

[75] Inventor: Anthony C. Evans, Westland, Mich.

[73] Assignee: Kelsey-Hayes Company, Romulus, Mich.

[22] Filed: Feb. 28, 1974

[21] Appl. No.: 446,735

[52] U.S. Cl. .......... 188/71.9; 188/72.7; 188/196. D
[51] Int. Cl.² .......................................... F16D 65/56
[58] Field of Search ....... 188/71.8, 71.9, 72.6, 72.7, 188/72.8, 196 BA, 196 D, 79.5 K; 192/70, 25, 111 A

[56] References Cited
UNITED STATES PATENTS

| | | | |
|---|---|---|---|
| 3,331,472 | 7/1967 | Swift | 188/71.9 |
| 3,337,008 | 8/1967 | Trachte | 188/72.6 |
| 3,365,029 | 1/1968 | Swift | 188/72.6 |
| 3,584,711 | 6/1971 | Margetts | 188/72.6 |
| 3,590,964 | 7/1971 | Krause | 188/71.9 |
| 3,638,763 | 2/1972 | Laverdant | 188/72.7 |
| 3,724,605 | 4/1973 | Naismith | 188/71.8 |
| 3,768,601 | 10/1973 | Bejot | 188/196 D |
| 3,774,733 | 11/1973 | Farr | 188/71.9 |
| 3,809,189 | 5/1974 | Farr | 188/196 D |
| 3,885,653 | 5/1975 | Farr | 188/71.9 |

*Primary Examiner*—George E. A. Halvosa
*Assistant Examiner*—Edward R. Kazenske
*Attorney, Agent, or Firm*—Harness, Dickey & Pierce

[57] ABSTRACT

A combined hydraulically operated service and mechanically operated parking brake of the disk type. The components are arranged to provide an extremely compact assembly that may be fit into existing vehicles. The mechanical actuator includes a roller type cam mechanism with an externally actuated operating lever. The mechanism is constructed to provide a minimum number of seals and a lip type seal is embodied that will provide a ready indication on test if the seals of the hydraulic portion of the brake are defective. An improved automatic adjustor interconnects the mechanical actuator with the piston of the hydraulic brake to adjust for wear of the brake linings.

3 Claims, 4 Drawing Figures

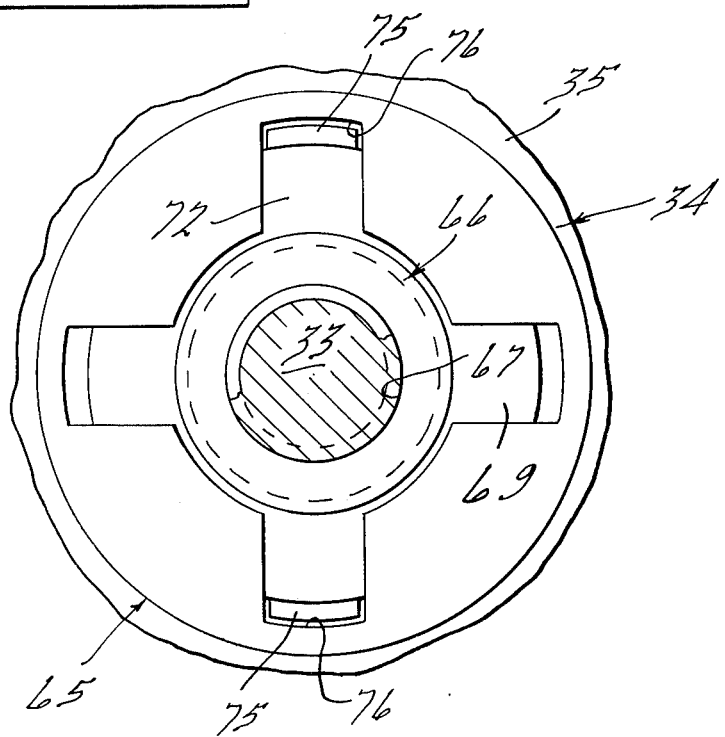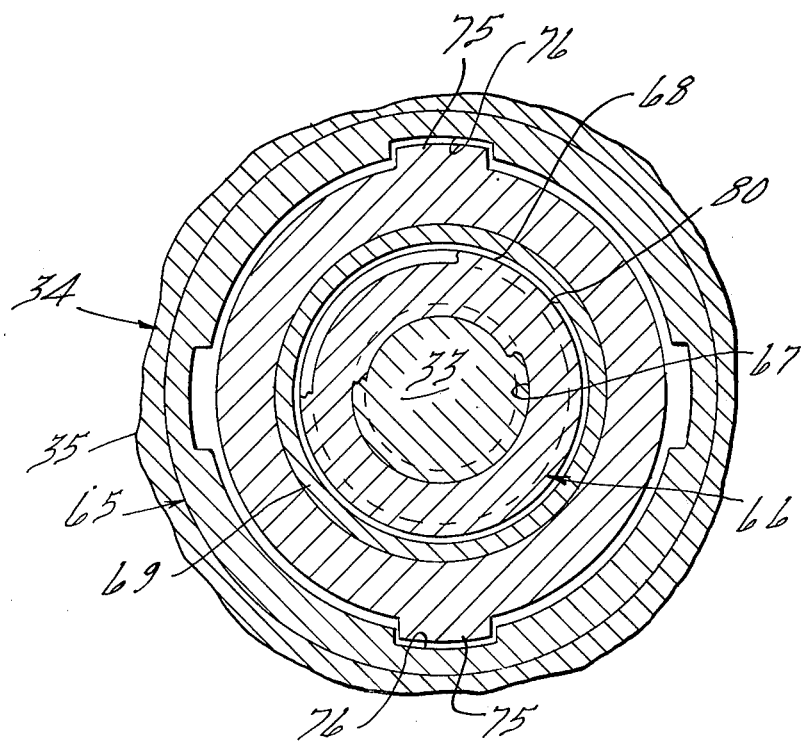

COMBINED SERVICE AND PARKING BRAKE WITH AUTOMATIC ADJUSTOR

BACKGROUND OF THE INVENTION

This invention relates to a disk type brake and more particularly to an improved brake of this type that is both hydraulically and mechanically operated and to an automatic adjustor for such brake.

Although the advantages of disk brakes for automotive applications have been acknowledged, the adoption of rear disk brakes has been slow. One reason for the reluctance of vehicle manufacturers to adopt rear disk brakes is the difficulty in providing an effective and compact parking brake. For the most part, the parking brake function has been provided by a separate pair of mechanically actuated brake pads. The use of a completely separate parking brake adds greatly to the expense.

It is, therefore, a principal object of this invention to provide an improved disk brake assembly that is both hydraulically and mechanically operated.

It is a further object of this invention to provide an improved dual actuated disk brake assembly in which both the hydraulic and mechanical actuators operate on the same brake pad.

Although disk brake structures have been proposed in which both hydraulic and mechanical actuators operate the same brake pad, the previously proposed devices have been relatively bulky. Specifically, such devices have had considerable dimension in the direction parallel to the axis of rotation of the brake rotor. As a result, it has been difficult if not impossible to fit such brakes into existing vehicles.

It is, therefore, a still further object of this invention to provide a compact hydraulically and mechanically operated disk brake assembly.

It is another object of this invention to provide a compact hydraulically and mechanically actuated disk brake assembly that may be conveniently fit into existing vehicles.

When both hydraulic and mechanical actuators operate on the same brake pad, it has been the practice to have the mechanical actuator operate on the piston of the hydraulic motor to achieve mechanical actuation. With such an arrangement, the intrusion of additional elements into the fluid motor presents problems in effecting good sealing of the fluid motor.

It is, therefore, yet another object of this invention to provide a hydraulically and mechanically actuated disk brake assembly with a minimum number of seals.

With hydraulically and mechanically operated disk brakes of the type described it has been the practice to position the mechanical actuator in a separate chamber in the brake housing assembly which chamber is adjacent the cylinder bore of the fluid motor. Previous constructions have provided seals around the externally operated component of the mechanical actuator to prevent fluid leakage. Such arrangements, however, present certain disadvantages in initial assembly line testing. If the seal of the externally operated mechanical element is good and the internal seal between the fluid motor and the mechanical actuator is bad, initial testing will fail to indicate this internal leakage.

It is, therefore, another object of this invention to provide a sealing arrangement for a combined hydraulically and mechanically operated disk brake assembly in which failures of the seals of the hydraulic portion of the brake may be readily detected.

Although many commercial forms of hydraulically operated disk brakes are inherently self-adjusting, mechanically operated disk brakes or combined hydraulically and mechanically operated disk brakes require some form of adjusting mechanism to permit compensation for lining wear. It has been the practice with brakes of the type described to provide an automatic adjustor between the mechanical actuator and the hydraulic piston for this purpose.

It is another object of this invention to provide an improved automatic adjustor for a disk brake assembly and to provide an improved mechanically and hydraulically operated disk brake embodying an improved automatic adjustor.

SUMMARY OF THE INVENTION

A first feature of this invention is adapted to be embodied in a combined hydraulically and mechanically actuated disk brake assembly. The brake includes a housing assembly that defines a cylinder bore adapted to be juxtaposed to the braking surface of an associated brake rotor. The cylinder bore terminates at a wall of the housing assembly. A piston is slidably received in the cylinder bore and is adapted to actuate an associated brake pad. A fluid inlet communicates with the cylinder bore for selective pressurization of the cylinder bore and hydraulic actuation of the brake pad. A bore extends through the housing assembly wall and an imperforate actuating member extends through this bore. The actuating member has an operative connection with the piston for mechanically actuating the piston upon movement of the actuating member. Mechanical actuating means positioned externally of the cylinder bore is adapted to move the actuating member and mechanically actuate the brake pad. Sealing means is interposed between the bore and the actuating member for providing the sole fluid seal preventing fluid leakage from the cylinder bore past the actuating member.

Another feature of this invention is adapted to be embodied in a combined hydraulically and mechanically actuated disk brake assembly. The brake includes a housing assembly that defines a cylinder bore adapted to be juxtaposed to the braking surface of an associated brake rotor. The cylinder bore terminates at a wall of the housing assembly. A piston is slidably received in the cylinder bore and is adapted to actuate an associated brake pad. A fluid inlet communicates with the cylinder bore for selective pressurization of the cylinder bore and hydraulic actuation of the brake pad. A bore extends through the housing assembly wall and an actuating member extends through this bore. The actuating member has an operative connection with the piston for mechanically actuating the piston upon movement of the actuating member. Rotary cam means exert an axial force on the actuating member for actuating the piston. An actuating lever is supported for rotation about an axis and is held against movement along the axis. Means operatively connect the actuating lever with the rotary cam means for mechanically operating the brake pad upon pivotal means of the actuating lever.

Yet a further feature of the invention is adapted to be embodied in a combined hydraulically and mechanically actuated disk brake assembly. The brake includes a housing assembly that defines a cylinder bore adapted to be juxtaposed to the braking surface of an associated brake rotor. The cylinder bore terminates at a wall of the housing assembly. A piston is slidably received in the cylinder bore and is adapted to actuate an associated brake pad. A fluid inlet communicates with the cylinder bore for selective pressurization of the cylinder bore and hydraulic actuation of the brake pad. A bore extends through the housing assembly wall and an actuating member extends through the bore. The actuating member has an operative connection with the piston for mechanically actuating the piston upon movement of the actuating member. The housing assembly defines an opening contiguous with the cylinder bore on the opposite side of the wall at the base of the cylinder bore. Seal means cooperate with the actuating member for precluding fluid leakage from the cylinder bore into the housing assembly opening. Cam means are contained within the housing assembly opening for operating the actuating member to mechanically actuate the piston. Operating means are provided for operating the cam means. The operating means has a portion that extends through the housing assembly for permitting external mechanical actuation. A lip type seal is interposed between the housing assembly and the operating means portion. The lip type seal is disposed to prevent the ingress of foreign material into the housing assembly opening but is disposed to permit the leakage of fluid under pressure from the housing assembly opening to provide a visual indication of leakage from the cylinder bore in the event the seal means that cooperates with the actuating member is defective.

Yet another feature of this invention is adapted to be embodied in an automatic adjusting mechanism for a disk brake or the like. The automatic adjusting mechanism has a housing that is adapted to be received in a piston of the associated brake. A threaded member is rotatably journalled within the housing and has internal threads adapted to engage a cooperating externally threaded member and external threads. A drive ring is rotatably positioned within the housing between the threaded member and the housing and has a threaded connection with the external threads of the threaded member. Means are provided for transferring an axial force exerted on said housing to an axial force on the drive member for rotating the threaded member. One-way brake means are interposed between the housing and the drive member for limiting the degree of reverse rotation of said drive member for altering the axial at rest position of the automatic adjusting mechanism upon the cooperating externally threaded member in response to a predetermined degree of overtravel.

BRIEF DESCRIPTION OF THE DRAWINGS

FIG. 3 is a cross-sectional view taken along the line 3—3 of FIG. 2.

FIG. 4 is a cross-sectional view taken along the line 4—4 of FIG. 2.

DETAILED DESCRIPTION OF THE PREFERRED EMBODIMENTS

Figure 1:
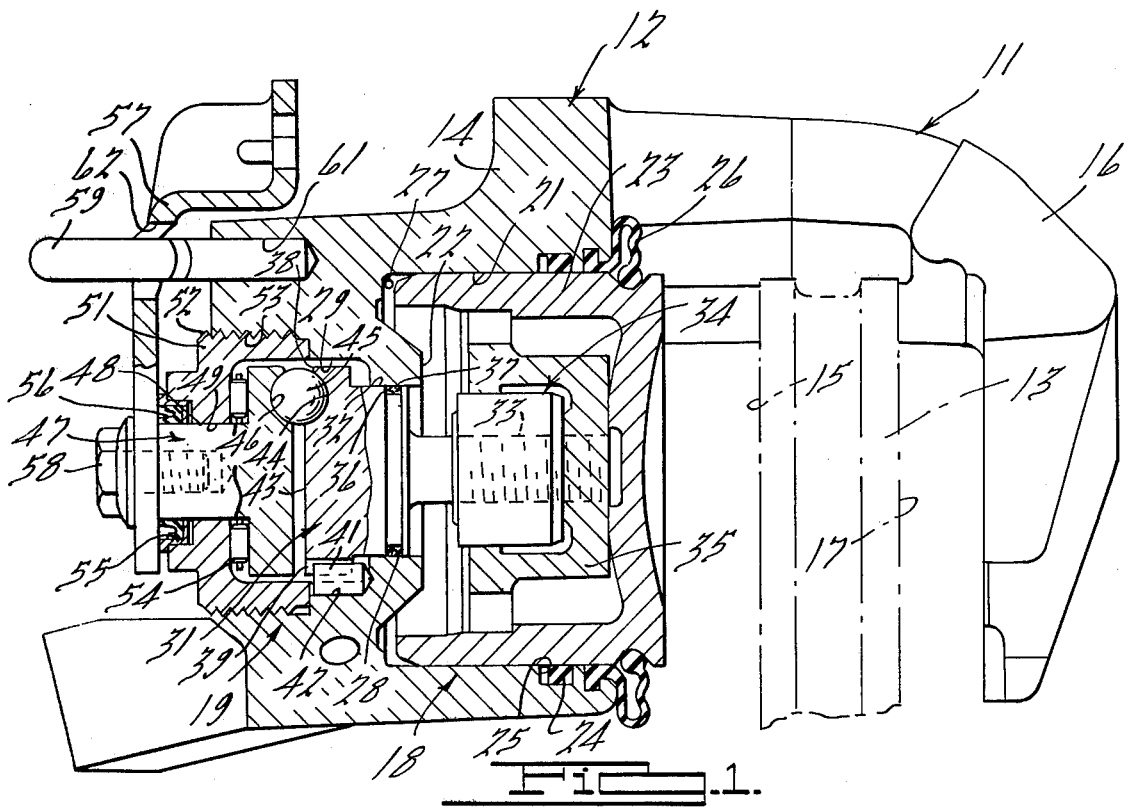
FIG. 1 is a cross-sectional view of a combined service and parking type disk brake embodying this invention and taken along the longitudinal axis of the hydraulic motor.

Referring first to FIG. 1, a disk brake assembly embodying the invention is identified generally by the reference numeral 11. The disk brake assembly 11 includes a caliper, indicated generally by the reference numeral 12, which is supported in any known manner for sliding movement in a direction parallel to the axis of rotation of the associated brake rotor, which rotor is indicated generally by the reference numeral 13 and is shown in phantom. The caliper 12 has a first leg portion 14 juxtaposed to a first braking surface 15 of the rotor 13 and a second leg portion 16 juxtaposed to a rotor braking surface 17. As is well known in this type of brake, brake pads (not shown) are interposed between the caliper leg portions 14 and 16 and the respective rotor braking surfaces 15 and 17.

The caliper leg portion 14 contains the actuating mechanisms for the brake. The actuating mechanisms include a hydraulic actuator comprising a fluid motor, indicated generally by the reference numeral 18 and a mechanical actuator, indicated generally by the reference numeral 19. The fluid motor 18 is comprised of a cylinder bore 21 that extends axially through the caliper leg portion 14 and which terminates at a wall 22. A piston 23 is slidably supported within the bore 21. A seal 24 is positioned within a groove 25 formed adjacent the actuator end of the bore 21 to sealingly engage the piston 23 and preclude the leakage of fluid from the cylinder bore 21. A dust boot 26 of any known type is positioned at the outer terminus of the bore 21 and prevents the impinging of dirt on the sliding surface of the piston 23. A fluid inlet passage 27 extends through the caliper 12 into the cylinder bore 21 at the base of the piston 23. Fluid is introduced to the bore 21 by the passage 27 from a master cylinder (not shown) to cause the piston 23 to exert a hydraulic actuating force on its associated brake pad. At the same time, a reactive force is exerted on the caliper 12 that causes it to slide in an axial direction whereby the caliper portion 16 urges its associated brake pad into engagement with the rotor braking surface 17.

The mechanical actuator 19 includes a bore 28 formed in the caliper 12 concentrically with the cylinder bore 21 and extending through the wall 22. At its outer end, the bore 28 terminates in an opening 29 formed by the caliper portion 14. An actuating member, indicated generally by the reference numeral 31 has a cylindrical portion 32 that is slidably received in the bore 29. Adjacent the inner termination of the portion 32, a threaded extension 33 is formed. An automatic adjusting mechanism, indicated generally by the reference numeral 34 has a threaded connection, to be described, with the threaded extension 33 and is in turn press fit into an adaptor 35. The adaptor 35 is, in turn, staked in any suitable manner to the piston 23 so that it will move simultaneously with the piston.

The actuating member portion 32 is formed with a circumferential groove 36 in which a seal 37 is positioned. It should be noted that the actuating member 31 is a solid piece so that the seal 37, which engages the bore 28, provides an effective and the sole fluid seal between the cylinder bore 21 and the caliper opening 29.

The actuating member 31 has an enlarged diameter portion 38 that extends into the opening 29 and in which a keyway 39 is formed. A key 41 is received in the keyway 39 and into a corresponding keyway 42 formed in the caliper portion 14. Thus, the actuating member 31 is held against rotation but is free to move in an axial direction.

The actuating member portion 38 has an outwardly extending face 43 in which a plurality of cam recesses 44 are formed. In the preferred embodiment, three of these recesses are provided although only one appears in the drawings. Balls 45 are positioned within the cam recess 44 and within corresponding cam recesses 46 of an operating member 47. The operating member 47 has a cylindrical portion 48 that is journalled within a bore 49 of a retainer plug 51. The retainer plug 51 has external threads 52 that engage internal threads 53 of the caliper portion 14. Thurst bearings 54 are interposed between the retainer plug 51 and the operating member 47 so as to hold the operating member 47 against axial movement. At the outer end of the bore 49, a counter bore 55 is provided. A lip type seal 56 is positioned within the counter bore 55 and sealingly engages the operating member portion 48. The lip seal 56 is configured so that it will prevent the ingress of dirt and foreign material through the bore 49. The configuration is such, however, that it will not resist leakage from the opening 29 if any fluid pressure is present in this opening.

An actuating lever 57 is affixed angularly and axially to the operating member 47 by means including a bolt 58. For shipment, a retainer pin 59 is pressed into an opening 61 in the caliper portion 14 and passes through an opening 62 in the actuating lever 57. The retainer pin 59 holds the actuating lever 57 against rotation both during shipment and during installation. Once the brake assembly 11 has been completed and installed and the flexible actuator (not shown) attached to the lever 57, the pin 59 is removed and discarded.

Figure 2:
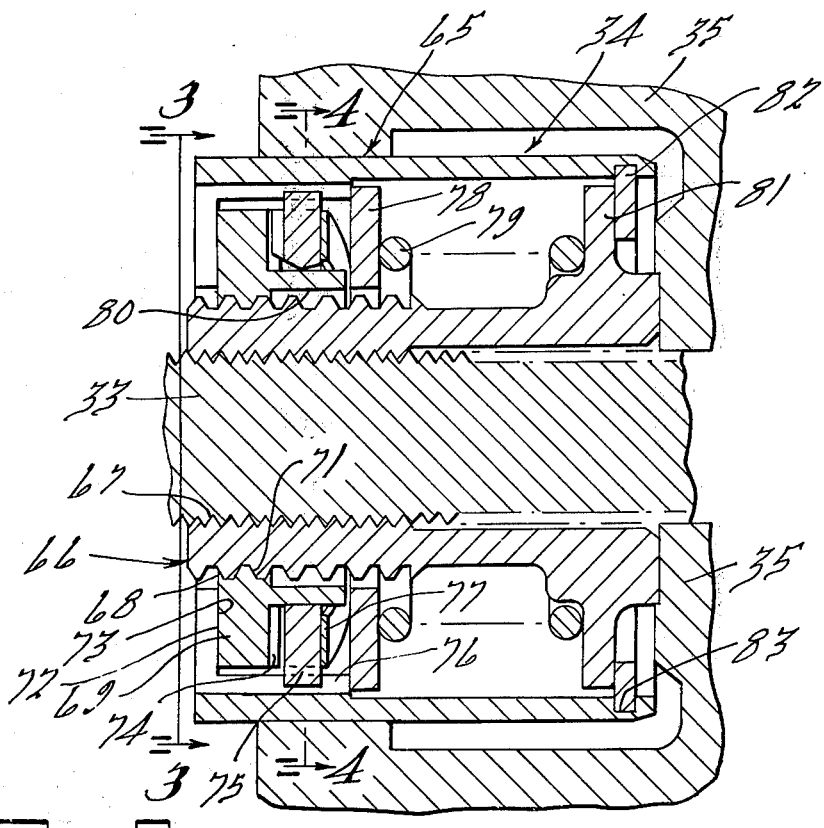
FIG. 2 is an enlarged cross-sectional view of the automatic adjustor of the brake shown in FIG. 1.

The construction of the automatic adjusting mechanism 34 will now be described by reference to FIGS. 2 thorugh 4. The automatic adjusting mechanism 34 includes an adjustor housing 65 that has a generally cylindrical, hollow shape. A threaded member, indicated generally by the reference numeral 66 is rotatably supported within the housing opening 65. The threaded member 66 has internal threads 67 that are threadably engaged with the threaded extension 33 of the actuating member 31. The threads 67 and 33 are of a relatively low pitch. The threaded member 66 also has external threads 68 of a substantially greater pitch than the threads 67.

A drive ring 69 is rotatably positioned within the housing 65 and has internal threads 71 that mate with the threaded member external threads 68. The drive ring 69 also has a face 72 that is in abutment with a corresponding face 73 of the housing 65.

Radially outwardly of the threads 71, the drive ring 69 is formed with a serrated face 74. A locking ring 75 has corresponding serrations that are adapted at times to engage the serrated face 74 to preclude rotation of the threaded member 69 in one direction and thus act as a one way brake. The locking ring 75 has a splined outer surface that is engaged with corresponding splines 76 of the actuator housing 65 so as to hold the locking ring 75 against rotation relative to the actuator housing 65. A spring washer 77 engages the locking member 75 and urges its serrated teeth into engagement with the drive member serrations 74. The drive ring 69 has a cylindrical projection 80 on which the locking ring 75 is positioned to locate these two members radially relative to each other.

The spring washer 77 bears against a spring retainer 78 which, in turn, is engaged by a coil compression spring 79. The opposite end of the spring 79 engages an enlarged flange 81 formed on the threaded member 66 and exerts a frictional drag tending to resist rotation of the member 66. The flange 81 is urged by the spring 79 also into engagement with a snap ring or locking washer 82 that is received within the groove 83 of the outer housing 65 to hold the components in their assembled condition. The spring 79 also exerts a restoring force on the elements of the adjusting mechanism 34 when the brake is deactuated.

OPERATION

To hydraulically actuate the brake assembly 11 fluid pressure is introduced into the cylinder bore 21 via the passage 27. The fluid pressure will cause the piston 23 to slide axially in the bore 21 and bring the associated brake pad into engagement with the rotor braking surface 15. Simultaneously, a reactive force will be exerted on the caliper 12 and the caliper portion 16 will force its associated brake pad into engagement with the rotor braking surface 17.

During this operation, the actuating member 31 is held against axial movement by the fluid pressure acting on the face of the portion 32. Thus, an axial force is exerted on the adjusting member 34 by the adaptor 35. This axial force is transmitted to the housing 65 of the adjustor 34 and, in turn, to the drive ring 69. The drive ring 69 will, by virtue of its threaded engagement with the threaded member 66 cause the threaded member 66 to rotate. The degree of this rotation will be a function of the differential screw action between the internal and external threads 67 and 68 of the threaded member 66. During this rotation, the ratchet action between the serrated face 74 of the drive ring 69 and of the locking ring 75 will, presumably, be less than the distance between adjacent pairs of the serrated face, assuming that there has been insufficient lining wear to require adjustment. When the brake is released, the movement of the adjustor 34 will be reversed and the pads will be returned to their normal at rest position.

In the event there is more than a predetermined degree of lining wear, as determined in part by the angular distance between the serrated teeth 74, the serrated teeth will move to new registry and the threaded member 66 will undergo less rotation than it experienced during actuation of the brake. Therefore, the threaded member 66 will be advanced axially along the threaded extension 33 of the actuating member 31. Since the threaded member 66 is axially fixed relative to the housing 65 and the housing 65 is axially fixed relative to the adaptor 35 and piston 23, the piston 23 will be held in a newly adjusted position relative to the caliper 12. Thus, the degree of brake lining wear is compensated for.

When the brake is to be operated mechanically, the operating lever 57 is pivoted. This pivotal movement is transmitted to the operating member 47 and causes relative rotation between the cam pockets 46 and 44. Thus, an axial force will be transmitted on the actuating mmember 31 which, in turn, acts through the automatic adjustor 34 and adaptor 35 on the piston 23. The combined action of the screw threads and the frictional resistance to turning of the threaded member 66 caused by the spring 79 overcomes any tendency for the automatic adjustor 34 to deadjust during mechanical operation. That is, the threaded member 66 will not rotate when the brake is mechanically adjusted.

Frequently when disk brakes are originally manufactured or when they are installed, the fluid pressure system is charged to permit the bleeding of air from it and to provide a hydraulic pressure test. If the seal around the operating member 47 were a tight fluid seal and the seal around the actuating member 31 were defective, fluid would leak from the hydraulically actuated portion 18 of the brake and specifically from the cylinder bore 21 into the opening 29. No visual indication of this leakage would, however, result. With the described construction, on the other hand, any pressurization of fluid within the opening 29 will cause the fluid to leak past the lip seal 56 and provide a visual indication of failure in the hydraulic portion of the brake assembly.

It is to be understood that the foregoing description is that of a preferred embodiment of the invention. Various changes and modifications may be made without departing from the spirit and scope of the invention as defined by the appended claims.

I claim:

1. A sliding caliper type disk brake comprising a caliper housing having first and second portions adapted to be disposed contiguous to respective braking surfaces of an associated disk brake rotor, a cylinder bore formed in said first caliper portion, a piston slidably supported in said cylinder bore and adapted to cooperate with a first brake pad, means for pressurizing said cylinder bore and urging said piston toward the associated rotor braking surface to actuate the associated brake pad and for creating a reactive force for sliding said caliper assembly axially relative to the associated brake rotor, said cylinder bore terminating at a wall of said first caliper portion, a bore extending through said wall and terminating at an opening, an actuating member having a first portion slidably terminating at an opening, an actuating member having a first portion slidably received in said bore and a second, threaded portion extending into said piston, automatic adjusting means operatively connecting said threaded portion of said actuating member to said piston for actuating said piston upon axial movement of said actuating member, said automatic adjusting means comprising a housing received within the piston and affixed against axial movement relative thereto, a threaded member rotatably supported within said adjustor housing, the externally threaded portion of the actuating member extending into said threaded member, said threaded member having internal threads engaged with the threads on said actuating member, said threaded member having external threads of different pitch from said internal threads, a drive ring positioned within said adjustor housing and having a threaded connection with said external threads of said threaded member, means for transmitting axial force exerted upon said adjustor housing into axial force upon said drive ring for effecting a differential screw rotation of said threaded member, and one-way brake means operatively interposed between said threaded member and said housing for limiting the degree of reverse movement of said threaded member upon return brake action in response to a predetermined degree of lining wear, seal means interposed between said bore and said actuating member for preventing the leakage of fluid from said cylinder bore through said bore into said opening, said actuating member having a portion defining a first cam surface disposed within said caliper opening, an operating member rotatably supported by said first caliper portion and having a second cam surface facing said first cam surface, a plurality of balls interposed between said cam surfaces, means for precluding rotation of said actuating member, said operating member having a portion extending through said caliper assembly and journalled therein, thrust bearing means interposed between said operating member and said caliper housing for holding said operating member against axial movement, a lever affixed to said operating member for rotating said operating member and exerting an axial force upon said actuating member to mechanically actuate said piston.

2. A sliding caliper type disk brake comprising a caliper housing having first and second portions adapted to be disposed contiguous to respective braking surfaces of an associated disk brake rotor, a cylinder bore formed in said first caliper portion, a piston slidably supported in said cylinder bore and adapted to cooperate with a first brake pad, means for pressurizing said cylinder bore and uring said piston toward the associated rotor braking surface to actuate the associated brake pad and for creating a reactive force for sliding said caliper assembly axially relative to the associated brake rotor, said cylinder bore terminating at an integral wall of said first caliper portion, a bore extending through said wall and terminating at an opening formed integrally with said first caliper portion, an actuating member having a first portion slidably received in said bore and a second portion extending into said piston, automatic adjusting means operatively connecting said second portion of said actuating member to said piston for actuating said piston upon axial movement of said actuating member and for automatically adjusting for wear of at least the first brake pad, said automatic adjusting means comprising a housing received within said piston and affixed against axial movement relative thereto, a threaded member rotatably supported within said adjustor housing, said actuating member having an externally threaded portion extending into said threaded member, said threaded member having internal threads engaged with the threads on said actuating member, said threaded member having external threads of different pitch from said internal threads, a drive ring positioned within said adjustor housing and having a threaded connection with said external threads of said threaded member, means for transmitting axial force exerted upon said adjustor housing into a force acting upon said ring for effecting a differential screw rotation of said threaded member and one-way brake means operatively interposed between said threaded member and said housing for limiting the degree of reverse movement of said threaded member upon return brake action in response to a predetermined degree of lining wear, seal means interposed between said bore and said actuating member for preventing the leakage of fluid from said cylinder bore through said bore into said opening, rotary cam means disposed within said caliper opening, an operating member rotatably supported by said first caliper portion and operably connected to said rotary cam means for axially moving said actuating member upon rotary movement of said operating member to mechanically actuate said piston.

3. A disk brake assembly as set forth in claim 2 wherein the rotary cam means has a portion extending through a second bore in the caliper housing adjacent said opening and further including a lip type seal interposed between said second bore and said cam means portion, said lip type seal being disposed to prevent the ingress of foreign material and to permit the discharge of fluid under pressure.

* * * * *